United States Patent
Poledna

(10) Patent No.: US 9,880,911 B2
(45) Date of Patent: Jan. 30, 2018

(54) METHOD FOR HANDLING FAULTS IN A CENTRAL CONTROL DEVICE, AND CONTROL DEVICE

(71) Applicant: FTS COMPUTERTECHNIK GMBH, Vienna (AT)

(72) Inventor: Stefan Poledna, Klosterneuburg (AT)

(73) Assignee: FTS COMPUTERTECHNIK GMBH, Vienna (AT)

( * ) Notice: Subject to any disclaimer, the term of this patent is extended or adjusted under 35 U.S.C. 154(b) by 100 days.

(21) Appl. No.: 14/776,359

(22) PCT Filed: Mar. 13, 2014

(86) PCT No.: PCT/AT2014/050064
§ 371 (c)(1),
(2) Date: Sep. 25, 2015

(87) PCT Pub. No.: WO2014/138767
PCT Pub. Date: Sep. 18, 2014

(65) Prior Publication Data
US 2016/0034363 A1 Feb. 4, 2016

(30) Foreign Application Priority Data

Mar. 14, 2013 (AT) .................................. A 200/2013
Dec. 13, 2013 (AT) ............................... A 50824/2013

(51) Int. Cl.
*G06F 11/16* (2006.01)
*G06F 11/20* (2006.01)
(Continued)

(52) U.S. Cl.
CPC ...... *G06F 11/2005* (2013.01); *G05B 19/0428* (2013.01); *G05B 23/0289* (2013.01);
(Continued)

(58) Field of Classification Search
CPC .. G06F 11/0724; G06F 11/2005; G06F 11/16; G06F 11/3089
(Continued)

(56) References Cited

U.S. PATENT DOCUMENTS 6,625,749 B1 * 9/2003 Quach ................. G06F 11/1641
712/220
8,127,180 B2 * 2/2012 Baleani ............... G06F 11/1641
714/25

(Continued)

*Primary Examiner* — Chae M Ko
(74) *Attorney, Agent, or Firm* — Eversheds Sutherland (US) LLP

(57) ABSTRACT

The invention relates to a method for handling faults in a central control device, wherein the control device comprises a distributed computer system (100), to which distributed computer system (100) sensors (112, 113, 122, 123) are connected or can be connected, wherein the distributed computer system (100), particularly all the components of the computer system, is distributed to a first fault containment unit FCU1 (101) and a second fault containment unit FCU2 (102), wherein FCU1 (101) and FCU2 (102) are each supplied with power via a separate, independent power supply, and wherein FCU1 (101) and FCU2 (102) interchange data solely via galvanically separated lines, and wherein some of the sensors are connected at least to FCU1 (101) and the remainder of the sensors are connected at least to FCU2 (102), and wherein FCU1 (101) and FCU2 (102) are connected to a redundantly designed communication system (131, 132) having one or more actuators, so that, if FCU1 fails, FCU2 will maintain a limited functionality using the sensors assigned to FCU2, and if FCU2 fails, FCU1 will maintain a limited functionality using the sensors assigned to FCU1.

38 Claims, 1 Drawing Sheet

Figure 1:
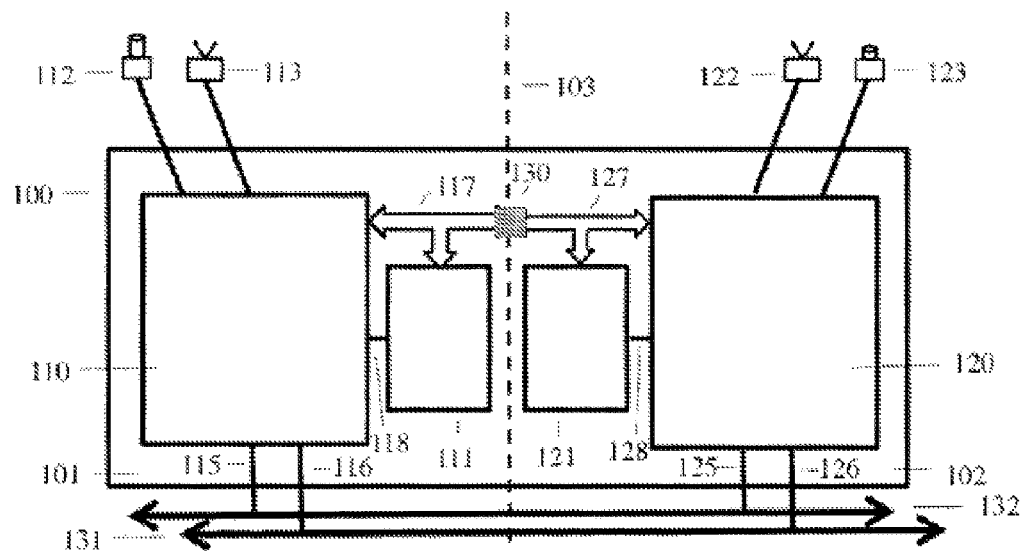

(51) Int. Cl.
*G05B 19/042* (2006.01)
*G05B 23/02* (2006.01)

(52) U.S. Cl.
CPC .............. *G05B 23/0291* (2013.01); *G05B 2219/24175* (2013.01); *G05B 2219/25232* (2013.01); *G05B 2219/2637* (2013.01); *G05B 2219/31366* (2013.01); *G06F 2201/805* (2013.01); *G06F 2201/85* (2013.01); *Y02P 90/14* (2015.11)

(58) Field of Classification Search
USPC ........................................................ 714/11
See application file for complete search history.

(56) References Cited

U.S. PATENT DOCUMENTS

| | | | | |
|---|---|---|---|---|
| 2002/0065996 | A1* | 5/2002 | Garnett | G06F 11/1658 711/156 |
| 2002/0129296 | A1* | 9/2002 | Kwiat | G06F 11/182 714/10 |
| 2003/0037177 | A1* | 2/2003 | Sutton | H04L 41/024 719/316 |
| 2003/0182594 | A1* | 9/2003 | Watkins | H04L 1/22 714/11 |
| 2004/0019771 | A1* | 1/2004 | Quach | G06F 11/1641 712/229 |
| 2006/0126256 | A1* | 6/2006 | Forest | B60W 50/029 361/139 |
| 2006/0200688 | A1* | 9/2006 | Tofigh | H02H 1/0015 713/300 |
| 2006/0243570 | A1* | 11/2006 | Hasch | B60Q 1/1469 200/61.28 |
| 2007/0294559 | A1* | 12/2007 | Kottke | G06F 11/1641 713/601 |
| 2010/0049268 | A1* | 2/2010 | Martins | G06F 11/2025 607/9 |
| 2010/0122072 | A1* | 5/2010 | Yarimizu | G06F 11/3664 712/227 |
| 2010/0324756 | A1* | 12/2010 | Fletcher | G05B 19/0428 701/3 |
| 2011/0035149 | A1* | 2/2011 | McAndrew | G05D 1/0038 701/466 |
| 2011/0191627 | A1* | 8/2011 | Koning | G06F 11/20 714/5.1 |
| 2012/0079321 | A1* | 3/2012 | Williams | G06F 1/30 714/14 |
| 2012/0117415 | A1* | 5/2012 | Arumugham | G06F 1/10 713/503 |
| 2012/0204059 | A1* | 8/2012 | Preston | B60R 25/00 714/10 |
| 2012/0304024 | A1* | 11/2012 | Rohleder | G06F 9/28 714/49 |
| 2013/0007513 | A1* | 1/2013 | Traskov | G06F 11/165 714/10 |
| 2013/0024721 | A1* | 1/2013 | Kabulepa | G06F 11/1641 714/5.1 |
| 2013/0245865 | A1* | 9/2013 | Chenu | B61L 15/0036 701/19 |
| 2013/0308440 | A1* | 11/2013 | Grossman | H04L 65/605 370/218 |
| 2013/0311139 | A1* | 11/2013 | Osmundsen | G05B 17/02 702/183 |
| 2014/0019818 | A1* | 1/2014 | Jindal | G06F 21/556 714/724 |
| 2014/0277827 | A1* | 9/2014 | Chinnadurai | G07C 5/008 701/1 |
| 2014/0281079 | A1* | 9/2014 | Biskup | G06F 13/4022 710/110 |
| 2015/0224845 | A1* | 8/2015 | Anderson | B60G 17/019 701/37 |
| 2015/0339201 | A1* | 11/2015 | Kanekawa | G06F 11/165 714/6.11 |

* cited by examiner

METHOD FOR HANDLING FAULTS IN A CENTRAL CONTROL DEVICE, AND CONTROL DEVICE

The invention relates to a method for handling faults in a central control device, wherein the control device comprises a distributed computer system, to which distributed computer system sensors are connected or can be connected.

The invention further relates to a control device, in particular a central control device, wherein the control device comprises a distributed computer system, to which distributed computer system sensors are connected or can be connected.

The invention further relates to a system comprising such a control device, to which control device a number of sensors, in particular two or more are connected.

Finally, the invention relates to a motor vehicle comprising at least one such control device, wherein a number of sensors are connected to the control device.

The present invention is applicable particularly in the field of motor vehicle electronic systems.

Technological and economic developments in the field of microelectronics and sensor technology have allowed electronic driver assistance systems for motor vehicles to be designed which provide substantial assistance to the driver in many driving situations. A typical assistance system consists of a number of varied and to some extent redundant sensors (e.g. camera(s), radar, lasers, ultrasonic sensors), which cyclically monitor the area surrounding the vehicle, and which transmit pre-processed data to a central control device for the purpose of data merging and further data analysis. The central control device uses these data to calculate correcting variables for steering, braking and the engine of the vehicle, allowing the vehicle to drive autonomously under certain conditions.

In June 2012, the NCAP organization (European New Car Assessment Program) published a roadmap [8] which indicates that Autonomous Emergency Braking (AEB) systems will be introduced into new motor vehicles on a broad scale starting in 2016. It is further anticipated that electronic systems for autonomous driving will be introduced first into the market for premium vehicles and then later into the mass market.

From a technical/commercial standpoint, it is a major challenge to design these electronic systems, the functionality of which has already been demonstrated in prototypes [2], in such a way that the required functionality and reliability can be achieved at a reasonable cost. In addition to the one-time costs of development, in the mass market the recurring costs of producing the computer hardware are the recurring production costs that are of particular importance, especially in the mass market.

In a driver assistance system, the reliability and safety of the features is of paramount importance. Because, in principle, any component of a technical system could fail, care must be taken to ensure, through the appropriate use of redundancy, that even if a sensor or an electronic component should fail, the critical functions of the system as a whole can be maintained. Because the triple backup of electronic systems for masking a fault, routinely used in electronic systems for aircraft, cannot be implemented in electronic systems for vehicles for reasons of cost, new methods for achieving the required reliability and safety must be found.

The object of the present invention is to provide a method for handling faults in a control device, in particular a central control device, e.g. a control device for a motor vehicle, so that even if a sensor or an electronic component should fail, the essential functions of the control device can be maintained, allowing the vehicle to be guided autonomously to a safe state, for example.

A further object of the invention is to provide a control device, in particular a central control device, preferably a control device for a motor vehicle, which is capable of maintaining the essential functions of a sensor or an electronic component even if said sensor or component should fail, allowing the vehicle to be guided autonomously to a safe state, for example.

This object is attained with a method as described in the introductory part and with a control device as described in the introductory part, in that, according to the invention, the distributed computer system, in particular all components of the computer system, is distributed to a first fault containment unit FCU1 and a second fault containment unit FCU2, wherein FCU1 and FCU2 are each supplied with power via a separate, independent power supply, and wherein FCU1 and FCU2 interchange data solely via galvanically separated lines, and wherein some of the sensors are connected at least to FCU1 and the remainder of the sensors are connected at least to FCU2, and wherein FCU1 and FCU2 are connected to a communication system having one or more actuators, in particular for forwarding results from the fault containment units to the actuators, with the result that, if FCU1 fails, FCU2 will maintain limited functionality using the sensors assigned to FCU1, and if FCU2 fails, FCU1 will maintain limited functionality using the sensors assigned to FCU2. The communication system is preferably designed as redundant.

According to the invention, the functions of the central control device are distributed to two independent fault containment units (FCUs), FCU1 and FCU2. An FCU is a unit that encapsulates all the direct consequences of a fault of one of its components (see [5, p. 136]). Each of the two FCUs consists of two subsystems, SS1, which executes a specified function, and SS2, which monitors the proper performance of SS1. Some of the sensors are connected at least to FCU1, and the remainder are connected at least to FCU2. The two FCUs, FCU1 and FCU2, are supplied with power by separate power supplies, and communicate via galvanically separated lines to preclude the propagation of a hardware fault from one FCU to the other FCU.

Each of the two FCUs is capable of monitoring the surrounding area without assistance from the other FCU and the sensors associated therewith, and of maintaining a minimal functionality of the vehicle. This minimal functionality enables limited but safe operation of the vehicle until a safe state is reached (e.g. autonomous parking of the vehicle along the curb, or until the driver can take over manual control of the vehicle). Under normal circumstances, when both FCUs are functioning properly, full functionality is provided.

For purposes of reliability (and for cost reasons), the two FCUs are arranged on a single circuit board. Arranging the two FCUs on a single circuit board allows the signals from the FCUs to be interchanged via conductor tracks without mechanical connector assemblies. Experience has shown that a conductor track is substantially more reliable (and less costly) than a connector assembly. This advantage carries with it the disadvantage that in (rare) cases of a permanent hardware fault, the entire circuit board must be replaced.

The present invention therefore describes how the design and the functioning of a central control device in a vehicle make the failure of a part of the control device and the sensors tolerable. It is proposed to distribute the functions of the central control device to two independent fault containment units (FCUs), wherein each FCU is connected to some of the sensors and is equipped with its own power supply, and the two FCUs interchange data solely via galvanically separated lines. If one FCU or the sensors connected thereto should fail, the other FCU is capable of maintaining the specified functioning in limited scope using its sensors. None of the patents [1]-[4] identified within the framework of a patent analysis discloses a device or a method that corresponds to or approaches those described above.

Advantageous embodiments of the method according to the invention and the control device according to the invention are described in the dependent claims, wherein any combination of the preferably technical features listed below can be implemented:

- FCU1 and FCU2 or one or more components of FCU1 and one or more components of FCU2 have access to a globally synchronized time;
- FCU1 and FCU2 each consist of a first subsystem SS1 and a second subsystem SS2, wherein the first subsystems SS1 process the sensor data and the second subsystems SS2 monitor the functioning of the respective first subsystem SS1;
- the second subsystems SS2 periodically execute a challenge response protocol to verify the functioning of the first subsystem SS1;
- the second subsystems SS2 monitor the supply of power to their fault containment unit;
- the second subsystems SS2 periodically verify the data structures within their fault containment unit;
- a second subsystem periodically transmits an I am alive message to the other fault containment unit;
- the time of the arrival on schedule of the periodic I am alive message is monitored by the other fault containment unit by means of a timeout;
- the time at which the I am alive message is transmitted and the time of the timeout monitoring of the I am alive message are synchronized in the receiving fault containment unit over the global time;
- in the event of a detected failure of a fault containment unit, particularly detected by the expiration of the timeout of the I am alive message, the surviving fault containment unit implements a limited functionality using the sensors assigned to it;
- each functioning fault containment unit periodically transmits the relevant part of its internal state to the other fault containment unit;
- after the failure of the first subsystem SS1 of a fault containment unit, the second subsystem SS2 initiates a reset of the first subsystem SS1, which prompts the failed fault containment unit to carry out a reintegration using the internal state of the other fault containment unit;
- a monitoring and simulation component monitors data from the sensors and simulates the functioning of the sensors in real time;
- FCU1 and FCU2 are arranged on a single circuit board;
- a sensor assigned to a fault containment unit can be connected or is connected directly to said fault containment unit;
- a sensor assigned to a fault containment unit is connected or can be connected to a message distribution unit, which message distribution unit can be connected or is connected both to the fault containment unit assigned to said sensor and to the other fault containment unit;
- FCU1 and FCU2 can be connected or are connected to a variety of sensors, particularly for monitoring the surroundings, e.g. of a motor vehicle;
- a monitoring and simulation component can be connected to the message distribution units;
- the control device is provided for controlling brakes and/or steering and/or acceleration in a motor vehicle;
- the FCUs contain a variety of software;
- the FCUs are connected to a global clock;
- the FCUs are connected to a fault-tolerant global clock;
- the FCUs are connected by means of an Ethernet communication system;
- the two FCUs, FCU1 and FCU2, are arranged on a circuit board in such a way that no galvanic connection exists between the two FCUs;
- a housing of the circuit board has two closed chambers, with one FCU being arranged in each chamber.

In the following, an embodiment of the invention will be described in greater detail by way of example, with reference to the set of drawings. The drawings show FIG. 1 the configuration of a central control device according to the invention, and FIG. 2 the connection of sensors to the central control device via the message distribution unit.

FIG. 1 shows the configuration of a control device, in particular of a central control device. The functioning of the control device is implemented by means of a distributed computer system, the components of said distributed computer system being arranged on a central circuit board 100. The components of the computer system are, for example, CPUs, GPUs, FPGAs, memory components, etc.

The computer system is distributed to an FCU1 101, located to the left of dividing line 103, and an FCU2 102, located to the right of dividing line 103, to which FCUs the components of the computer system are distributed.

FCU1 101 consists of a functional subsystem SS1 110 and a monitor subsystem SS2 111. In the non-limiting example shown, two sensors 112, 113 are connected directly to SS1 110. SS2 111 of FCU 101 is connected via a databus 117 to SS1 110 and via a galvanic separator 130 having a databus 127 to FCU2 102. SS2 111 can transmit a hardware reset signal to SS1 110 via a direct line 118. SS1 110 is connected via a link 115 to a databus 132 and via a link 116 to a databus 131.

The configuration of FCU2 102 is similar to that of FCU1. FCU2 102 consists of a functional subsystem SS1 120 and a monitoring subsystem SS2 121. In the non-limiting example shown, two sensors 122, 123 are connected directly to SS1 120. SS2 121 of FCU 102 is connected via a databus 127 to SS1 120 and via galvanic separator 130 to databus 117 of FCU1 101. SS2 121 can transmit a hardware reset signal to SS1 120 via direct line 128. SS1 120 is connected via a link 125 to databus 132 and via link 126 to databus 131.

The sensors 112, 113, 122, 123 are generally varied (diverse), for example, sensor 112 can be a camera with a telephoto lens, sensor 113 can be a radar sensor, sensor 122 can be a laser sensor and sensor 123 can be a camera with a wide-angle lens. The system is designed to ensure that each of the two FCUs is capable of maintaining limited operation using the sensors assigned to it.

Common examples of sensors include: cameras, laser sensors, infrared sensors, radar sensors, ultrasound sensors or wireless connections to the infrastructure (car to infrastructure) or to other vehicles (car to car). Information regarding the road (e.g. icing) or traffic (backup resulting from an accident) can be captured via these wireless connections.

Preferably, all the components of FCU1 110 and FCU2 120, along with the connected sensors 112, 113, 122, 123, have access to a global time. Clock synchronization can be implemented by means of the standard IEEE 1588 [7].

During normal operation, SS1 110 of FCU1 101 periodically receives data from sensors 112 and 113 and processes these data in order to detect objects in the area surrounding the vehicle, for example. Similarly, SS1 120 of FCU2 102 periodically receives data from sensors 122 and 123 and processes these data in order to detect objects in the area surrounding the vehicle, for example.

The detected objects are then interchanged via bus 117 of FCU1 101 and bus 127 of FCU2 102, in order, in this example, to improve a model of the area surrounding the vehicle. On the basis of this improved model of the surrounding area, the two SS1s calculate the desired correcting variables and periodically provide these correcting variables to the actuators via a preferably redundant communication system in the form of redundant buses 131 and 132. During normal operation, at the end of a cycle an actuator receives four identical values, two from FCU1 101 (one via bus 131 and one via bus 132) and two from FCU2 102 (one via bus 131 and one via bus 132).

Preferably, the communication channels of the communication system are likewise galvanically separated, e.g. via opto-couplers. Since the two FCUs are also galvanically separated, it is ensured that an individual fault, e.g. a short-circuit, will affect only one FCU.

To prevent a physical fault (e.g. water penetration) from damaging both FCUs at the same time, it is advantageous for the housing of the circuit board 100 to have two separate, isolated chambers.

The sensors 112, 113 and 122, 123, each connected to a common FCU, preferably form an autonomous sensor system in each case. A sensor system is autonomous if it supplies all the information necessary for creating a model of an environment.

Since a variety of sensors are connected to the two FCUs FCU1 and FCU2, the software of these FCUs is also preferably varied (diverse). The diversity of the software is of great advantage, since it is highly unlikely that a software fault will take effect in both versions at the same time.

Once the information regarding the objects detected in the area surrounding the vehicle has been synchronized by means of the galvanically separated communication channels, the FCUs calculate the correcting values for an actuator system. The actuator system comprises, e.g., the actuation of the brakes and/or the steering system and/or the acceleration of a motor vehicle.

During normal operation, the monitoring components SS2 (components 111 in FCU 101 and 121 in FCU 102) monitor the supply of power to the respective FCU, the plausibility of the data structures of the respective FCU and the functioning of processing components SS1 (components 110 in FCU 101 and 120 in FCU 102).

The plausibility of the data structures of the FCU is verified in a syntactic and preferably also a semantic plane. Syntactic verification refers to the formal integrity of the data structure. Semantic verification involves the plausibility of the values stored in the data structures.

The functioning of processing components SS1 is monitored by the periodic execution of a challenge response protocol. A challenge response protocol is a special form of a request-reply protocol. Transmitter SS2 periodically forwards an input datum to SS1 and challenges SS1 (request) to calculate the result by means of a predetermined program which comprises the execution of the greatest possible number of hardware commands by SS1, and to respond within a predetermined amount of time (reply). If the result calculated by SS1 is correct and on schedule, SS2 will conclude that the hardware of SS1 is functioning.

If all the checks establish a fault-free state of the monitored SS1, SS2 111 of FCU1 101 transmits an I am alive message to SS2 121 of FCU 102 via bus 117. Similarly, SS2 111 of FCU2 102 transmits an I am alive message to SS1 111 of FCU 101 via bus 127. The corresponding recipient of the I am alive message monitors this periodic message using a timeout. According to the invention, the time at which the I am alive message is transmitted is synchronized with the time of the timeout of the I am alive message over the global time, in order to minimize fault detection latency.

If no fault is detected, then FCU1 110 will periodically transmit the relevant part of its inner state and the global time to FCU2 120. Similarly, if no fault is detected, FCU2 120 will periodically transmit the relevant part of its inner state and the global time to FCU1 110. The relevant part of the inner state comprises the information about the ground states that is classified as relevant.

When developing an application, a decision must be reached regarding what information about the ground state is relevant in said application. For example, in a driver assistance system, it may be determined that all objects that have a diameter greater than 10 cm and lie in the roadway are to be displayed in the relevant part of the inner state of the model which describes the area surrounding the vehicle.

If a fault occurs in FCU1 101 or in one or more of sensors 112 or 113 connected to FCU1, or if the supply of power to FCU1 101 fails, then SS2 111 will not transmit an I am alive message to SS2 121. SS2 121 will detect the fault immediately due to the absence of the periodic I am alive message from SS2 111. SS2 121 will then challenge SS1 120 of FCU2 102 to implement the limited operation using the existing sensors 122 and 123, and to bring the vehicle to a safe state.

If a fault occurs in FCU1 102 or in one or more of sensors 122 or 123 connected to FCU2, or if the supply of power to FCU2 102 fails, then SS2 121 will not transmit an I am alive message to SS2 111. SS2 111 will detect the fault immediately due to the absence of the periodic I am alive message from SS2 121. SS2 111 will then challenge SS1 110 of FCU2 101 to implement the limited operation using the existing sensors 112 and 113, and to bring the vehicle to a safe state.

Since the likelihood of a transient fault occurring is several orders of magnitude greater than that of a permanent fault occurring [5, p. 155], the faulty FCU will immediately attempt an autonomous restart following detection of a fault. First, SS2 will implement a hardware reset to re-initialize all the internal data structures of SS2. In the next step, SS2 will prompt a hardware reset of SS1 and of the sensors connected to SS1 via the hardware reset line (line 118 in FCU1 101 or line 128 in FCU2 102). The FCU will then wait until the message with the relevant part of the inner state of the functional FCU arrives. This message also contains the global time and enables the time synchronization of the faulty FCU and the connected sensors. The starting FCU will then adopt the inner state of the partner FCU and will complete reintegration by retransmitting the I am alive message.

Figure 2:
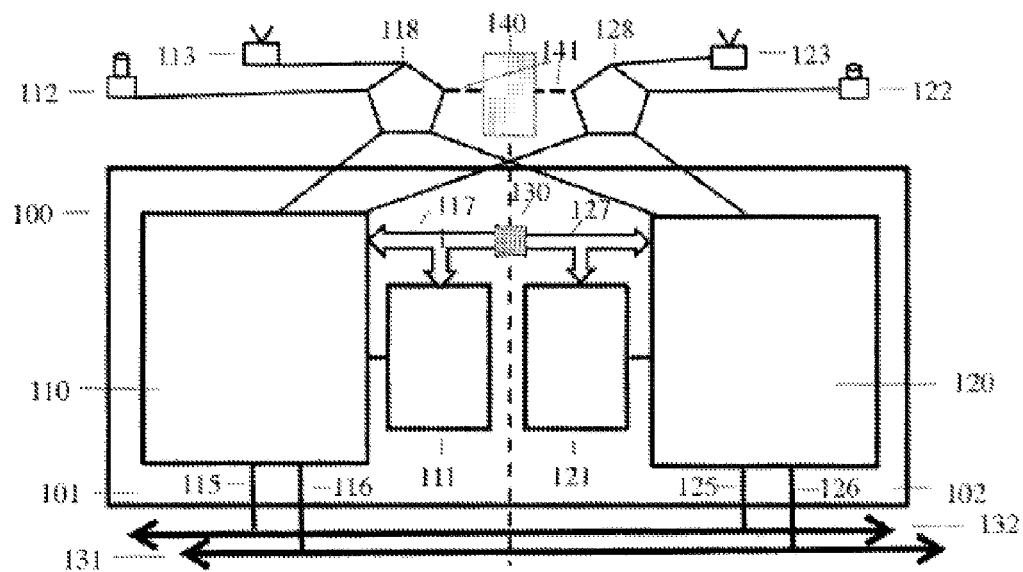

FIG. 2 shows an alternative for connecting the sensors. A message distribution unit 118 is inserted between sensors 112 and 113 and the FCUs, so that the sensor data from 112 and 113 can be transmitted to both FCU1 101 and FCU2 102. Similarly, a message distribution unit 128 is inserted between sensors 122 and 123 and the FCUs, so that the sensor data from 122 and 123 can be transmitted to both FCU1 101 and FCU2 102.

The advantage of this alternative, which is associated with higher costs, is that, if a fault occurs in an FCU, the remaining functioning FCU has access to all sensor data. A further advantage is that an external monitor and simulator 140 can be connected to distribution units 118 and 128 via connections, for example connector assemblies, so that during start-up, all sensor data are monitored without impacting system performance, and during the replay process, the stored sensor data can be retransmitted in real time to FCU 101 and FCU 102, to allow specific cases to be reanalyzed in detail. The TT Ethernet protocol [6] is one option for use as a protocol for message distribution units 118 and 128.

The advantageous embodiments described in reference to FIG. 1 can also be implemented in connection with this embodiment.

The present invention discloses a control device, in which the required, highly integrated electronic components can be arranged, preferably on a single circuit board, in such a way that, even if a fault occurs, a necessary minimal functionality can be maintained. With the corresponding arrangement of all essential components, particularly on a single circuit board, production costs are reduced while at the same time reliability is improved, since no additional cable and connector assemblies, particularly between circuit boards, are necessary. Experience has shown that cable and connector assemblies are substantially less reliable than the conductor tracks on a circuit board.

The essential concept of the present invention consists in distributing the sensors for monitoring the surrounding area and the electronic system required for evaluation into two preferably autonomous fault containment units (FCU). An FCU is understood as an isolated sensor/hardware/software subsystem in which the immediate consequences of a fault of this subsystem (regardless of whether it is a hardware or software or sensor fault) are limited to said subsystem [5, p. 136]. An FCU is autonomous if said FCU is capable of generating minimal functionality without referring to an additional FCU.

It is not necessary for the two FCUs to be equipped with identical sensors. For example, it is possible to dispense with duplicating costly sensors that monitor the surroundings, since the multiplicity of varied sensors (laser, camera, radar, infrared, etc.) supply highly redundant information regarding the state of the surroundings.

The two subsystems can interchange information via a communication channel between the two FCUs, which is galvanically separated. Under normal circumstances (when both FCUs are functioning), the data supplied by all the sensors can therefore be used to construct an internal, three-dimensional model of the area surrounding a vehicle. In this model, all objects that are detected by the sensors are depicted spatially and are classified (e.g. whether they are an obstacle or a shadow). If an obstacle is detected in the roadway ahead, corresponding information (e.g. braking or steering) is provided to the actuators.

The proposed control system preferably functions cyclically. A cycle begins with monitoring the surroundings by means of the sensors. The sensor data are then forwarded to the FCU which is connected to the sensor, for processing and model construction. In the subsequent step, the models of the two FCUs are synchronized. By tracking an object (object tracking) in successive cycles, the direction and speed of movement of the object can be determined [9]. At the end of a cycle, the target values for the actuators are calculated. The duration of a cycle that contains all the described steps is typically 10 msec.

It is advantageous for the cycles of the two FCUs to be synchronized. The cycles of the two FCUs can be synchronized by a central clock or by means of a fault-tolerant clock [see, e.g., 5, p. 69].

If one of the two FCUs should fail due to a fault, the remaining functional FCU is capable of maintaining the required minimal functionality of the system.

CITED DOCUMENTS

[1] U.S. Pat. No. 8,566,633. Fuhrman, et al. Method of Dynamic Allocation on a Statically allocated and Embedded Software Architecture. Granted Oct. 22, 2013
[2] U.S. Pat. No. 7,669,073. Graham et al. System and Method for Split Mode Operation of Fault-Tolerant Computer Systems. Granted Feb. 23, 2010
[3] U.S. Pat. No. 6,654,910. Eibach et al. Intelligent Fault Management. Granted Nov. 25, 2003.
[4] US Patent Application 20110246831. Das; Dipankar et al. Method and Apparatus for Operational Level Functional and Degradation Fault Analysis. Published Oct. 6, 2011.
[5] Kopetz, H. Real-Time Systems, *Design Principles for Distributed Embedded Applications*. Springer Verlag. 2011.
[6] SAE Standard AS6802 von TT Ethernet. URL: http://standards.sae.org/as6802
[7] IEEE 1588 *Standard for a Precision Clock Synchronization Protocol for Network Measurement and Control Systems*. URL: http://www.ieee1588.com/
[8] NCAP Rating Group. *EURO NCAP Rating Review* 2012. Online at: http://www.euroncap.com/
[9] Babenko, B. et al. *Robust Object Tracking with Online Multiple Instance Learning*. IEEE Trans. On Pattern Analysis and Machine Intelligence. Vol. 33. No. 8. Pp. 1619-1632. August 2011.

The invention claimed is:
1. A method for handling faults in a central control device, wherein the central control device comprises a distributed computer system (100), to which sensors (112, 113, 122, 123) are operably connectable,
   wherein the distributed computer system (100) is distributed to a first fault containment unit FCU1 (101) and a second fault containment unit FCU2 (102),
   wherein FCU1 (101) and FCU2 (102) each consist of a first subsystem SS1 (110, 120) and a second subsystem SS2 (111, 121), wherein the first subsystems SS1 (110, 120) process sensor data from the sensors and the second subsystems SS2 (111, 121) monitor functioning of the respective first subsystem SS1 (110, 120),
   wherein FCU1 (101) and FCU2 (102) are each supplied with power via a separate, independent power supply,
   wherein FCU1 (101) and FCU2 (102) interchange data solely via galvanically separated lines,
   wherein some of the sensors are connected at least to FCU1 (101) and the remainder of the sensors are connected at least to FCU2 (102),
   wherein FCU1 (101) and FCU2 (102) are connected to a communication system (131, 132) having one or more actuators, and
   wherein FCU1 and FCU2, or one or more components of FCU1 and one or more components of FCU2, have access to a globally synchronized time.

2. The method of claim 1, wherein the communication system (131, 132) is redundant.

3. The method of claim 1, wherein the second subsystems SS2 (111, 121) periodically execute a challenge response protocol to verify the functioning of the respective first subsystem SS1 (110, 120).

4. The method of claim 1, wherein the second subsystems SS2 (111, 121) monitor the supply of power to FCU1 (101) or FCU2 (102).

5. The method of claim 1, wherein the second subsystems SS2 (111, 121) periodically verify the data structures within FCU1 (101) or FCU2 (102).

6. The method of claim 1, wherein the second subsystem (111, 121) periodically transmits an "I am alive" message to the other FCU1 (101) or FCU2 (102).

7. The method of claim 6, wherein the time of the arrival on schedule of the periodic "I am alive" message is monitored by the other FCU1 (101) or FCU2 (102) by means of a timeout.

8. The method of claim 7, wherein the time at which the "I am alive" message is transmitted and the time of the timeout monitoring of the "I am alive" message in the receiving FCU1 (101) or FCU2 (102) are synchronized over the global time.

9. The method of claim 1, wherein when a failure of FCU1 (101) or FCU2 (102) is detected by the expiration of the timeout of the "I am alive" message, the surviving FCU1 (101) or FCU2 (102) implements a limited functionality using the sensors assigned to it.

10. The method of claim 1, wherein each functioning FCU1 (101) or FCU2 (102) periodically transmits the relevant part of its internal state to the other FCU1 (101) or FCU2 (102).

11. The method of claim 1, wherein, after a failure of the first subsystem SS1 (110, 120) of FCU1 (101) or FCU2 (102), the second subsystem SS2 (111, 121) initiates a reset of the first subsystem SS1 (110, 120), which prompts the failed FCU1 (101) or FCU2 (102) to carry out a reintegration using the internal state of the other FCU1 (101) or FCU2 (102).

12. The method of claim 1, wherein a monitoring and simulation component monitors data from the sensors and simulates functioning of the sensors in real time.

13. A control device, wherein the control device comprises a distributed computer system (100), to which distributed computer system (100) sensors (112, 113, 122, 123) are operably connectable,
wherein the distributed computer system (100) is distributed to a first fault containment unit FCU1 (101) and a second fault containment unit FCU2 (102),
wherein FCU1 (101) and FCU2 (102) each consist of a first subsystem SS1 (110, 120) and a second subsystem SS2 (111, 121), wherein the first subsystems SS1 (110, 120) process sensor data from the sensors and the second subsystems SS2 (111, 121) monitor functioning of the respective first subsystem SS1 (110, 120),
wherein FCU1 (101) and FCU2 (102) are each supplied with power via a separate, independent power supply,
wherein FCU1 (101) and FCU2 (102) interchange data solely via galvanically separated lines,
wherein some of the sensors are connected at least to FCU1 (101) and the remainder of the sensors are connected at least to FCU2 (102),
wherein FCU1 (101) and FCU2 (102) are connected to a communication system (131, 132) having one or more actuators, and
wherein FCU1 and FCU2, or one or more components of FCU1 and one or more components of FCU2, have access to a globally synchronized time.

14. The control device of claim 13, wherein the communication system (131, 132) is redundant.

15. The control device of claim 13, wherein the second subsystems SS2 (111, 121) periodically execute a challenge response protocol to verify the functioning of the respective first subsystem SS1 (110, 120).

16. The control device of claim 13, wherein the second subsystems SS2 (111, 121) monitor the supply of power to FCU1 (101) or FCU2 (102).

17. The control device of claim 13, wherein the second subsystems SS2 (111, 121) periodically verify the data structures within FCU1 (101) or FCU2 (102).

18. The control device of claim 13, wherein the second subsystem (111, 121) periodically transmits an "I am alive" message to the other FCU1 (101) or FCU2 (102).

19. The control device of claim 18, wherein the time of the arrival on schedule of the periodic "I am alive" message is monitored by the other FCU1 (101) or FCU2 (102) by means of a timeout.

20. The control device of claim 19, wherein the time at which the "I am alive" message is transmitted and the time of the timeout monitoring of the "I am alive" message in the receiving FCU1 (101) or FCU2 (102) are synchronized over the global time.

21. The control device of claim 13, wherein, when the failure of FCU1 (101) or FCU2 (102) (101, 102) is detected by the expiration of the timeout of the "I am alive" message, the surviving FCU1 (101) or FCU2 (102) (102, 101) implements a limited functionality using the sensors assigned to it.

22. The control device of claim 13, wherein each functioning FCU1 (101) or FCU2 (102) (101, 102) periodically transmits the relevant part of its internal state to the other FCU1 (101) or FCU2 (102).

23. The control device of claim 13, wherein, after the failure of the first subsystem SS1 (110, 120) of FCU1 (101) or FCU2 (102) (101, 102), the second subsystem SS2 (111, 121) initiates a reset of the first subsystem SS1 (110, 120), prompting the failed FCU1 (101) or FCU2 (102) (101, 102) to carry out a reintegration using the internal state of the other FCU1 (101) or FCU2 (102).

24. The control device of claim 13, wherein a monitoring and simulation component monitors data from the sensors and simulates functioning of the sensors in real time.

25. The control device of claim 13, wherein FCU1 and FCU2 are arranged on a single circuit board (100).

26. The control device of claim 13, wherein a sensor of the sensors assigned to FCU1 (101) or FCU2 (102) is connectable directly to said FCU1 (101) or FCU2 (102).

27. The control device of claim 13, wherein a sensor of the sensors assigned to FCU1 (101) or FCU2 (102) is operably connectable to a message distribution unit, which message distribution unit is operably connectable both to the FCU1 (101) or FCU2 (102) assigned to the sensor and to the other FCU1 (101) or FCU2 (102).

28. The control device of claim 13, wherein FCU1 and FCU2 are operably connectable to the sensors, which comprise a variety of sensors.

29. The control device of claim 27, wherein a monitoring and simulation component is operably connectable to the message distribution units.

30. The control device of claim 13, wherein the control device is provided for controlling braking and/or steering and/or acceleration in a motor vehicle.

31. The control device of claim 13, wherein FCU1 (101) or FCU2 (102) contain a variety of software.

32. The control device of claim 13, wherein FCU1 (101) or FCU2 (102) are connected to a global clock.

33. The control device of claim 32, wherein FCU1 (101) or FCU2 (102) are connected to a fault-tolerant global clock.

34. The control device of claim 13, wherein FCU1 (101) or FCU2 (102) are connected by means of an Ethernet communication system.

35. The control device of claim 13, wherein FCU1 and FCU2 are arranged on a circuit board in such a way that there is no galvanic connection between FCU1 (101) or FCU2 (102).

36. The control device of claim 35, wherein a housing of the circuit board has two isolated chambers, one of FCU1 (101) or FCU2 (102) being arranged in each chamber.

37. A system comprising at least one control device of claim 13, wherein a number of the sensors are connected to the control device.

38. A motor vehicle comprising at least one control device of claim 13, wherein a number of the sensors are connected to the control device.

* * * * *